Patented May 9, 1933

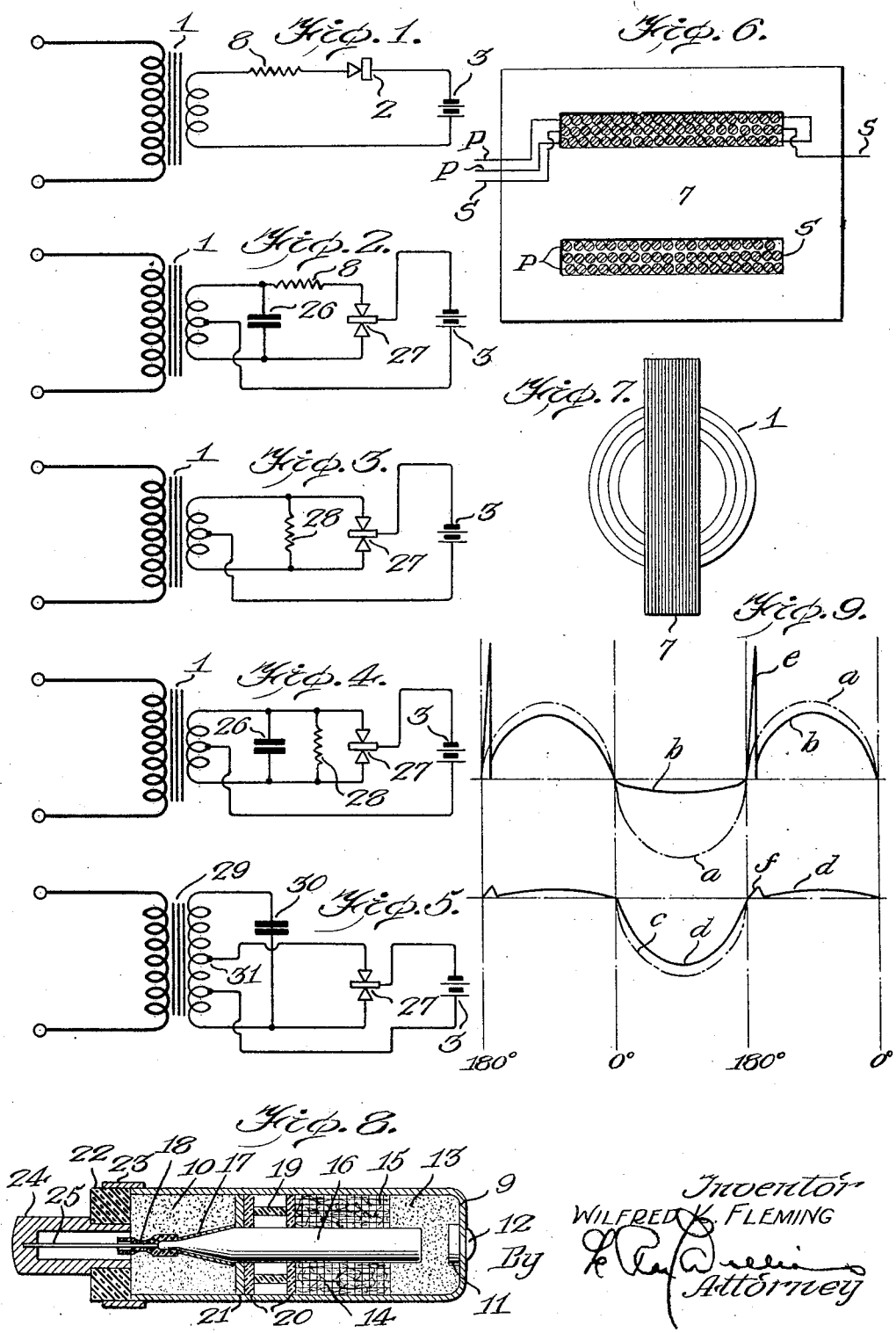

1,908,336

UNITED STATES PATENT OFFICE

WILFRED K. FLEMING, OF CAMBRIDGE, MASSACHUSETTS, ASSIGNOR TO RAYTHEON INC., OF CAMBRIDGE, MASSACHUSETTS, A CORPORATION OF MASSACHUSETTS

RECTIFYING SYSTEM

Application filed March 20, 1928. Serial No. 263,141.

In the use of certain forms of rectifiers, there is marked tendency for the impedance of the translating device to undergo the change from the condition of conducting to insulating at a point in the current cycle other than where the primary source current reverses i. e. where the current is zero. The change of impedance in response to polarity reversal often takes place beyond the point where the current wave cuts the zero axis and at a position well into the reverse current wave. The transition when once started is consummated rapidly due to the relatively large amount of reverse energy flowing at that time, making for an abrupt stoppage of current on account of high rectifier impedance and setting up across the rectifier a voltage ripple of large intensity. At the moment of impedance change, the current is suddenly stopped in the supply transformer, causing a collapse of the inductive field and producing a momentary rush of current having magnitude dependent upon the inductance of the secondary circuit. As a result, a voltage is produced in the output circuit of value expressed by the equation $$L \frac{di}{dt}$$

which may attain a large figure. It is evident that the minimization of the inductance or substantial elimination of the effect of factor $$\frac{di}{dt},$$

preferably both, will materially reduce or preferably dispose of the undesired impulses. The reduction of inductance may be accomplished by a special construction of transformer; the effect of factor $$\frac{di}{dt}$$

may be rendered innocuous by providing a circuit for dissipating the superfluous energy or a shunt by-pass of various forms.

While the lack of coincidence between current reversal and impedance change is particularly noticeable in electrolytic devices, the feature is generally present to various degrees in all forms of rectifiers. The ripples have for an immediate result, a variation in the output and hence noise in case the load is a radio set. In addition to the audible disturbances, the voltage fluctuation when large, may deleteriously affect the operating efficiency and life of the rectifier by subjecting the device to an excessive electrical stress.

I propose to effectively remove or reduce in various ways the detrimental effect of this voltage ripple to make available at the rectifier output a voltage of extreme uniformity and to increase the life of the rectifying unit. Other objects and features will be apparent as the specification is perused.

Exemplary embodiments of the arrangement forming the subject matter of the present invention are illustrated in the accompanying drawings, in which:

Figure 1 illustrates a system adapted to half wave rectifiers;

Figures 2 to 5 inclusive are applicable to full wave rectification;

Figures 6 and 7 show a preferred type of transformer;

Figure 8 is a longitudinal cross-sectional view of a preferred form of rectifier; while Figure 9 is a graph showing voltage and current curves applicable to the specific type of rectifier shown in Figure 8.

Figure 10:
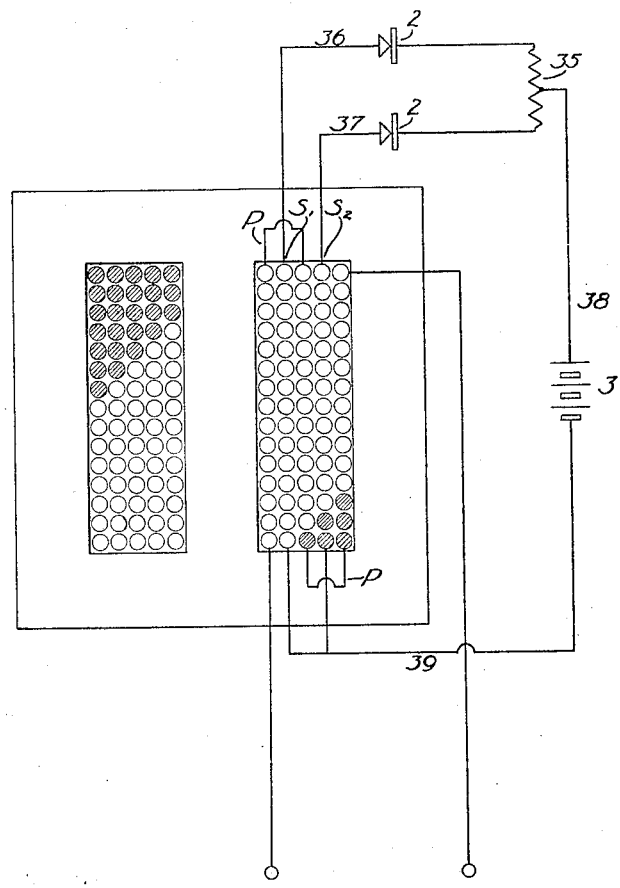
Figure 10 is a system for operating rectifiers in tandem.

Referring to Figure 1, numeral 1 indicates a voltage transformer, the primary of which is energized by a source of alternating current, ordinarily house supply. The terminals of the secondary are connected serially to a rectifying unit 2, shown as of the single wave type and a direct current load 3 indicated conveniently as a battery, the power supply of vacuum tubes or any other load. The rectifier 2 may take any form but is specially applicable to unilateral devices characterized by peak voltages i. e. having sharp voltage ripples due to lack of coincidence between the points of current reversal and cut-off. In order to obviate the effect of the voltage ripples, any one or all of the several expedients described hereinafter may be employed.

The transformer 1 shown is of special design, deriving relatively low leakage reactance, i. e. tight coupling, by reason of close spacial relation between the various windings. A simplified design is shown in Figures 6 and 7 wherein the secondary winding 4 is wound sandwich fashion, between the two halves 5 and 6 of the primary which are connected in series bringing out the leads $S^1$ and $S^2$, the primary being indicated by leads $P^1$ and $P^2$. The windings are mounted on the central branch of core 7, built of laminae. It is apparent that this construction precludes substantial magnetic leakage and as such reduces very materially the effect of peak voltage in the secondary circuit. A series resistance 8 may be employed to translate some of the excess energy derived from the peak voltage, into heat to be harmlessly dissipated. The resistance also materially aids in the voltage regulation of the circuit.

While the unilateral conductor 2 may be of any type, one having the characteristics set forth above is especially benefited by my invention. One such rectifier is the colloidal rectifier so-called, described and claimed in the application of André Serial No. 749,214, filed November 11, 1924, entitled "Unilateral conductor for rectifying alternating current" and other applications; a section through the rectifier is shown in Figure 8. Referring to this figure, numeral 9 designates a tube or receptacle of a metal passive to concentrated acid e. g. iron, having the exterior surface plated with cadmium or copper. One end of the receptacle is closed by the material forming the tube and the other by a non-corrosive pulverized packing 10 of the character which absorbs and neutralizes acid and is also pervious to air, e. g. magnesium oxide mixed with asbestos fibre. At the bottom of the container, there is located electrode 11 of a metal such as silver which lends itself readily to colloidal or comminuted form and oxidation products which are relatively good conductors of electrical energy. This electrode is firmly secured to the container by rivet 12, preferably of the same material as the anode.

Numeral 13 designates an anode in the form of a quantity of metal, as a powder or colloid, e. g. silver, derived by any known process and resting on this metal is a mass of liquid absorbing material as sand, glass-wool or the like. The fine metallic particles may be spaced from one another by thoroughly mixing with silica in amorphous form in proportion by volume varying between one part silver to ten parts silica and ten parts silver to one part silica although I prefer the form of silicon dioxide sold under the name of silocel, supercel or hyflo-supercel combined with an equal quantity of powdered metal. The combined mass is extremely porous offering ready access to liquid and packs loosely about the upstanding metallic member referred to hereinafter as cathode, to cause a yielding pressure therewith. For the absorbent 14, I may employ glass-wool felt of thickness approximately one-sixteenth inch and wound about the middle portions of the cathode until the roll is lodged fairly tight within the receptacle.

Horizontal lines 15 denote an acid oxidizing agent completely saturating the absorbent material. The acid is preferably sulphuric having concentration of approximately 1.840 combined with anhydrid as set forth in the André application referred to. Centrally disposed of the structure and sunk to considerable depth in the powdered silver is another electrode 16 hereinafter referred to as cathode, preferably in rod form and of a metal, as nickel containing silicon, in percentage ranging between 25 and 32, the alloys of iron-silicon, cobalt-silicon or alloys of tin containing antimony, bismuth, silicon or nickel, any or all of them, characterized by oxidation products which operated in conjunction with the anode to cause unidirectional flow of current. A device such as described has the property of rectifying alternating current of relatively large amplitude.

The end of the cathode farther removed from the anode is tapered and terminates in a lead-out wire, the tapered portion being preferably coated with a plastic compound 17, as asphaltum or paraffin, to prevent creepage of liquid. I may also provide glass rod 18 having a small aperture extending longitudinally and fused about the tapered portion of the cathode and lead-out wire, offering protection to the latter from acid attack. As shown, the top of rod is hollow forming long leakage paths for the acid. The inner surface of the container may also be coated with the same compound. In order further to prevent attraction of liquid, a glass ring 19 similarly coated and interposed between two mica washers 20 is placed upon an absorbent material; the upper washer preferably supports an asbestos member 21. The magnesium oxide filler supports a circular plate 22 of insulating material unaffected by acid, e. g. bakelite, vulcanite or ebonite, secured to the container by metallic ring 23.

The aforesaid coatings of plastic compound largely prevent creepage of the liquid along the coated surfaces and the absorbent material and absorb what little liquid tends to creep along these surfaces, whereby substantially no liquid escapes to cause damage to exterior surfaces or waste.

A terminal in the form of a thimble 24, preferably of steel, nickel plated, rises upwardly from the center of plate 22, being connected to cathode 16 by lead wire 25 of a material similar to that of the cathode. The lead preferably passes through the thimble and is secured to the upper surface thereof in suitable manner e. g. by soldering. It is apparent that the full or double wave rectifiers shown in Figures 2 to 5 may comprise two single wave units placed end to end and secured together in a single container.

When a rectifier of the colloid type is connected serially in a circuit to which alternating voltage is applied, and devoid of means for removing the ripples referred to hereinbefore, the voltage available at the output shows peaks of short duration but of considerable strength often reaching a value much greater than the maximum sine wave voltage. These peaks and their effect are illustratively emphasized in Figure 9, wherein curve $a$ in dot-dash represents the sine voltage, curve $b$, in full line the resulting output voltage, similarly, curve $c$, the sine wave current, and curve $d$ the actual current that is flowing to the load. It will be noted that the peak $e$ in the voltage curve representing the effect of displacement between the point of zero current and current cut-off in the rectifier, gives rise to a current impulse indicated at $f$, this impulse occurring in the reverse current wave. However, upon the insertion of a transformer having low leakage reactance and the resistance described above, either or both, the effect of the peak voltage is practically nullified or at least reduced in substantial degree.

In lieu of or in addition to the resistance, a capacity connected in shunt as an excess current by-pass may add its effect to that derived from the low leakage transformer and series resistance; thus in Figure 2, condenser 26 is shown connected across the line. The circuit is exemplified with respect to a double wave rectifier 27 although it pertains equally well to a single wave device; the transformer of special design may be employed to energize the rectifier as in Figure 1.

Figure 3 is similar to Figure 2 except that the by-pass condenser is omitted and the series resistance moved to a shunt position to comprise element 28.

Figure 4 shows the combination of a shunt condenser 26 and resistance 28, thus combining the by-passing effect of each of these elements.

Figure 5 illustrates a circuit which provides for a condenser smaller in value than in Figures 2 and 4 for the same effectiveness in output. This advantage is gained by employing a transformer 29 which has a voltage transformation greater than instead of comparable to the voltage required to energize the rectifier as in prior figures and connecting the shunt condenser 30 across the outside terminals of the secondary. The voltage for the rectifier is derived from an intermediate tap 31. It is apparent that the relatively high potential applied to the condenser inures to the rectifying circuit as a whole, either by way of a smaller condenser necessary or for a given condenser, a greater reduction of peak voltage and hence less noise in the radio set or other load.

The condensers, as utilized in this invention, are to be sharply distinguished from the buffer capacities, so-called, employed in connection with gaseous tube rectification inasmuch as the co-action between the buffer condenser and its associated rectifier is entirely different from that taking place between condensers 26, 30 and rectifiers 2 and 27. It is apparent that the function of the condensers and resistances in the various embodiments is to conserve the energy produced by the inductive kick, the condenser holding the momentary rush of current from discharge until a later and more propitious time and the resistance, dissipating energy by way of heat, in either case, removing the excess current from the load.

Figure 10 shows a system for operating two rectifiers in parallel. In this system, the transformer has primary P of an odd number of layers, so that the inner and outer layers are of the primary coil. Sandwiched in between these layers, are two secondary layers $S_1$ and $S_2$. It will be noted that no two primary or secondary layers are adjacent. Primary layers P are connected in series as shown to make a single electrical unit. Secondary layers $S_1$ and $S_2$ have separate leads 36 and 37 to rectifiers 2. These rectifiers are connected together by resistance 35, from the mid point of which, lead 38 is taken. The resistance 35 tends to equalize the loads on rectifiers 2 and prevents any from taking more than its share of the load. The lead 39 goes from battery 3, to which 38 is connected, to both secondaries $S_1$ and $S_2$. Thus on one end, the secondaries are separate while at the other end they are in parallel. In this way, my invention may be carried out to include more than two rectifiers in parallel. It is obvious that for more than two rectifiers in parallel, resistance 35 would be replaced by equal resistances coming from the rectifiers to a common output.

The systems as described, enable the procurement in the output circuit of a voltage devoid of peaks resulting from the fact that the point of current cut-off is delayed beyond the point of current reversal in the rectifier. It is apparent that if desired, filters of suitable design may be added subsequent to the rectifier for the purpose of smoothing whatever voltage ripple remains.

I claim:

1. A rectifying system comprising a plurality of rectifiers whose points of current cut-off and current reversal are not coincident, and a transformer of low leakage reactance, the said transformer having a plurality of secondaries, each of the said secondaries being disposed between primary coils, each of said secondaries being connected to a rectifier, the rectifiers having their output terminals connected to the output line through a resistance.

2. A rectifying system comprising a rectifier whose points of cut-off and current reversal are not coincident, said rectifier having electrode means of one polarity, and additional electrode means of opposite polarity, a source of alternating current, including an inductance, and a direct current load circuit, an electrode means of said rectifier of one polarity being connected to a fixed point on said inductance, one terminal of said load circuit being connected to an electrode means of opposite polarity of said rectifier, the other terminal of said load circuit being connected to another point on said inductance, and a resistance connected across two spaced points on said inductance.

3. A rectifying system comprising a rectifier whose points of cut-off and current reversal are not coincident, said rectifier having electrode means of one polarity and additional electrode means of opposite polarity, a source of alternating current including an inductance, a circuit comprising an electrode means of one polarity of said rectifier, additional electrode means of opposite polarity of said rectifier, and a direct current load circuit in series connected across said inductance, and a resistance connected in parallel across said inductance.

4. A rectifying system comprising a rectifier whose points of cut-off and current reversal are not coincident, said rectifier having electrode means of one polarity, and additional electrode means of opposite polarity, a source of alternating current including an inductance, and a direct current load circuit, an electrode means of said rectifier of one polarity being connected to a fixed point on said inductance, one terminal of said load circuit being connected to an electrode means of opposite polarity of said rectifier, the other terminal of said load circuit being connected to another point on said inductance, a resistance connected across two spaced points on said inductance, and a condenser connected across said resistance.

5. A rectifying system comprising a rectifier whose points of cut-off and current reversal are not coincident, said rectifier having electrode means of one polarity and additional electrode means of opposite polarity, a transformer having a primary and a secondary, said transformer having a low leakage reactance, a circuit comprising an electrode means of one polarity of said rectifier, an electrode means of opposite polarity of said rectifier, and a direct current load circuit in series connected across the secondary of said transformer, and a resistance connected in parallel with said secondary.

6. A rectifying system comprising a rectifier whose points of cut-off and current reversal are not coincident, said rectifier having a pair of electrodes of one polarity and additional electrode means cooperating therewith to permit current flow only in one direction with respect to said electrodes, a source of alternating current including an inductance, said inductance having its ends connected to said pair of rectifier electrodes, respectively, a direct current circuit having a pair of conductors connected to said additional electrode means of said rectifier and a point intermediate the ends of said inductance, respectively, a load connected in said direct current circuit, and a resistance connected across said inductance.

In testimony whereof, I have signed my name to this specification this 15th day of March, 1928.

WILFRED K. FLEMING.